United States Patent
Park et al.

(10) Patent No.: US 8,559,528 B2
(45) Date of Patent: Oct. 15, 2013

(54) SYNCHRONIZATION METHOD AND APPARATUS OF MOVING PICTURE EXPERTS GROUP TRANSPORT STREAM FOR REDUCING INITIAL DELAY

(75) Inventors: Sung-Jin Park, Seoul (KR); Ji-Won Ha, Seoul (KR); Jin-Wook Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1698 days.

(21) Appl. No.: 11/521,599

(22) Filed: Sep. 15, 2006

(65) Prior Publication Data

US 2007/0064814 A1 Mar. 22, 2007

(30) Foreign Application Priority Data

Sep. 15, 2005 (KR) .................. 10-2005-0086523

(51) Int. Cl.
*H04B 1/66* (2006.01)
(52) U.S. Cl.
USPC ................... 375/240.28; 375/240.27
(58) Field of Classification Search
USPC ..................... 375/240.27, 240.28
See application file for complete search history.

(56) References Cited

U.S. PATENT DOCUMENTS

| | | | |
|---|---|---|---|
| 5,767,800 A * | 6/1998 | Machida et al. ............ | 341/67 |
| 6,072,839 A | 6/2000 | Mondal et al. | |
| 6,118,819 A | 9/2000 | Kim | |
| 6,673,390 B2 | 1/2004 | Chen | |
| 6,816,560 B1 * | 11/2004 | Spalink ................... | 375/368 |
| 7,652,999 B2 * | 1/2010 | Liu et al. .................. | 370/241 |

FOREIGN PATENT DOCUMENTS

| EP | 1067721 A | 1/2001 |
|---|---|---|
| KR | 10-0474886 | 2/2005 |

OTHER PUBLICATIONS

European Telecommunications Standards Insitute (ETSI) EN 300 744 *Digital Video Broadcasting (DVB); Framing structure, channel coding and modulation for digital terrestrial television*, Nov. 2004.

* cited by examiner

*Primary Examiner* — Sath V Perungavoor
*Assistant Examiner* — Jeffery Williams
(74) *Attorney, Agent, or Firm* — Roylance, Abrams, Berdo & Goodman, L.L.P.

(57) ABSTRACT

A method and apparatus for synchronization of a moving picture experts group (MPEG) transport stream, which minimizes an initial delay are provided. A packet synchronization unit and a mode of the packet synchronization unit to are initialized to "0". Values of sync words are stored by shifting values of a sync word register when the sync words have been received and the received sync word is compared with predetermined code words As a result of the comparison, a determination is made as to whether a bit difference between the sync words and the predetermined code words exceeds a predetermined threshold value. A verification is then made as to whether all bits of the sync words correspond to all bits of the predetermined code words, when it is determined as a result of the determination that the bit difference is less than or equal to the predetermined threshold value and the MPEG transport stream is descrambled before returning to step of storing values of sync words by shifting values of a sync word register.

12 Claims, 6 Drawing Sheets

SYNCHRONIZATION METHOD AND APPARATUS OF MOVING PICTURE EXPERTS GROUP TRANSPORT STREAM FOR REDUCING INITIAL DELAY

CROSS-REFERENCE TO RELATED PATENT APPLICATION

This application claims the benefit under 35 U.S.C. 119(a) of a Korean Patent Application filed in the Korean Intellectual Property Office on Sep. 15, 2005 and assigned Ser. No. 2005-86523, the entire disclosure of which is incorporated by reference.

BACKGROUND OF THE INVENTION

1. Field of the Invention

The present invention relates to a synchronization method and apparatus of a moving picture experts group (MPEG) transport stream. More particularly, the present invention relates to a synchronization method and apparatus of an MPEG transport stream which can minimize an initial delay.

2. Description of the Related Art

In general, digital multimedia broadcasting (DMB) uses a moving picture experts group (MPEG) scheme. The MPEG is constructed with a unit of predetermined length, and a sync word for synchronization is inserted into the first portion of the MPEG. The sync word facilitates a receiver's recognition of the start point in a packet unit of the MPEG. There is no indicator defined to represent a start point or an end point in an MPEG, except for the sync word. This is because the MPEG has been designed to minimize supplementary information, other than multimedia broadcasting contents to be transmitted, in order to reduce unnecessary waste of frequency resources. Therefore, a receiver must accurately find MPEG packet units with a minimum amount of necessary information.

According to this technology, which is generally applied to terrestrial DMB (T-DMB), synchronization is confirmed when all MPEG sync words correspond to predetermined sync words. That is, in the case of an MPEG transport stream (TS) packet, the first byte of a Reed-Solomon (RS) packet fixedly contains a specific word, which is a sync word defined in the standard. T-DMB includes a hexadecimal number 0x47 as a sync word, and digital video broadcasting-Handheld (DVB-H) includes one 0xB8 value and seven 0x47 values as a sync word. Therefore, a word recorded in the first byte of an MPEG TS packet is compared with a predetermined sync word in order to determine if the two words correspond to each other. When the word recorded in the first one byte of an MPEG TS corresponds to the sync word, the position of the compared byte is determined as a start point of the MPEG TS packet.

According to the general technology, a determination is made as to whether sync words located at the first position of each received Reed-Solomon (RS) packet correspond to predetermined sync words defined in the standard. Once the received sync words correspond to the predetermined sync words, a synchronization timing is determined. In the case of a DVB-H, sync words to be compared have eight bytes (i.e., 64 bits). When a bit error rate (BER) is high, a long time period may be required to detect a synchronization timing at which the 64-bit sync words of MPEG TS packets correspond to the predetermined sync words. If there is a high BER, an error frequently occurs, and a probability of no error in all of the consecutively-received 64 bits is low.

While a very low BER in a good channel environment may allow immediate acquisition of an MPEG TS synchronization signal, a high BER environment may require a long time period to detect a synchronization timing. This does not cause a problem if an MPEG TS packet synchronization has already been acquired, but may cause a problem in the case of an initial synchronization. This is because a synchronization timing, which can be obtained based on a relieved condition, may be missed. If a synchronization timing has been missed, it can be impossible to perform a descrambling operation and therefore impossible to decode an MPEG TS packet.

FIGS. 1 and 2 illustrate the construction of a DVB-H transmission/reception system, in which MPEG TS synchronization is processed by time slicing processors 103 and 213. The procedure for transmitting a Multi-Protocol Encapsulation-Forward Error Correction (MPE-FEC) frame will now be described with reference to FIG. 1.

FIG. 1 is a block diagram illustrating the construction of a transmitter in a typical DVB-H system. The DVB-H system shown in FIG. 1 can transmit IP data as broadcasting data to a plurality of users, and simultaneously, can transmit RS parity data to correct an error in the broadcasting data.

An MPE-FEC encoder 101 creates an MPE section including an IP datagram in order to transmit the IP datagram in a unit of sections, which will be transmitted as broadcasting data, and also creates an MPE-FEC section including parity data for forward error correction (FEC) of the MPE section. The parity data is created through RS encoding, which is a well-known outer encoding technology. An output of the MPE-FEC encoder 101 is transferred to a time slicing processor 103, so that it may be subjected to a time slicing process to transmit broadcasting data as a burst. One MPE-FEC frame is transmitted through one burst section. Meanwhile, the IP datagram, which has been subjected to the time slicing process, may be subjected to a high priority (HP) stream process, and then may be subjected to a serial/parallel signal conversion process according to a modulation order and a hierarchical or non-hierarchical transmission mode.

A bit interleaver 105 and a symbol interleaver 107 perform a bit interleaving operation and a symbol interleaving operation with respect to a received signal, respectively, in order to disperse transmission errors. Next, the interleaving-processed signal is mapped to a symbol based on a predetermined modulation scheme, such as QPSK, 16QAM, or 64QAM, through a symbol mapper 109. The interleaving-processed signal is then transmitted to an inverse fast Fourier transform (IFFT) 111. The IFFT 111 converts a frequency-domain signal into a time-domain signal, and then outputs the time-domain signal. A guard interval is inserted into the IFFT-processed signal through a guard interval inserter (not shown), thereby creating a baseband OFDM symbol signal. The OFDM symbol is pulse-shaped by a digital baseband filter, is modulated through an RF modulator 113, and is then transmitted through an antenna 115 as a TS packet, which is a DVB-H signal.

FIG. 2 is a block diagram illustrating the construction of a receiver in a typical DVB-H system.

A TS packet, which has been transmitted through a wireless network, is received to an RF demodulator 203 via an antenna 201. OFDM symbols of the TS packet are converted into a frequency-domain signal through a fast Fourier transform 205. The OFDM symbols have been subjected to a frequency down-conversion process and have been converted into digital signals through the RF demodulator 203. A symbol demapper 207 performs a symbol demapping operation with respect to a received signal based on a predetermined modulation scheme, such as QPSK, 16QAM, or 64 QAM, A symbol interleaver 209 and a bit interleaver 211 perform a symbol interleaving operation and a bit interleaving operation, respectively, thereby reproducing an original signal.

Also, a time slicing processor 213 repeats a switching operation to receive a TS packet including an MPE-FEC frame in every predetermined burst section. Herein, the burst section can be recognized by receiving Delta-T information, which is included in the header of each of the MPE and MPE-FEC sections and indicates a start time of a following burst section. Particularly, the time slicing processor 213 may include a channel decoder 217, a packet synchronization unit 219, and a descrambler 221. In the DVB-H, scrambling is performed eight MPEG packets by eight MPEG packets.

An MPE-FEC decoder 215 performs a filtering operation to filter a packet identifier (PID). Detection of a packet identifier from header information of a TS packet through the filtering operation is an indication that an MPE section or MPE-FEC section has been received. In contrast, when a packet identifier is not detected, the MPE-FEC decoder 215 receives program specific information/service information (PSI/SI) from the TS packet to receive service information about broadcasting reception, such as application or non-application of MPE-FEC and time slicing, Meanwhile, the MPE-FEC decoder 215, which has received the broadcasting service information, identifies an IP datagram of an MPE section and parity data of an MPE-FEC section, which are included in an MPE-FEC frame, from the received TS packet. Then, the MPE-FEC decoder 215 stores the IP datagram and the parity data in a data area and a parity area of an internal buffer, respectively, and performs an RS decoding operation, thereby reproducing original broadcasting data.

FIG. 3 is a view illustrating the structures of TS and RS packets in a typical DVB-H system.

TS packets are shown as a multiplexing (MUX) packet 300 including eight MPEG packets. Herein, synchronization 1 to 8 (SYNC 1 to SYNC 8) 330 to 360 represent a 1-byte sync word, and 187-byte randomized data 360 represent a payload. Also, a pseudo-random bit sequence period 310 has a size of 1503 bytes. An RS packet includes synchronization 1 or "n" (SYNC 1 or SYNC n) 321, 187-byte randomized data 323, and 16 parity bytes 325.

FIG. 4 is a flowchart illustrating an MPEG TS synchronization procedure in a typical DVB-H system. When signals received by the receiver pass through the time slicing processor 213 after passing through several processing units, the procedure of FIG. 4 is performed.

In step 400, the packet synchronization unit 219 of FIG. 2 is initialized. Received signals pass through the packet synchronization unit 219 via the channel decoder 217. The packet synchronization unit 219 only receives sync words from data which has passed through the channel decoder.

SYNC 1 to SYNC 8 330 to 360 of FIG. 3, that is, sync words of sequentially-received MPEG packets are stored in a shift register, in which a synchronization operation is performed whenever a MPEG packet has been received. The register must store eight sync words, which is performed in step 402. Herein, a comparison operation is performed with respect to received sync words, such as, with respect to all 64-bit sync words. In step 404, when a bit difference between the received sync words and predetermined sync words does not exceed a specific threshold value, synchronization is acquired. In step 406, the descrambler 221 is initialized. After the comparison step, step 402 is performed again in which received sync words are shifted. In step 406, the descrambler 221 descrambles eight packets after being initialized, and then is again initialized. That is, the descrambler operates in a period of eight packets.

In this case, only the remaining payloads of MPEG packets, except for sync words, are scrambled. The receiver accurately finds a synchronization timing by using sync words, and performs a descrambling operation. The failure of the receiver to achieve synchronization results in the receiver's inability to descramble received MPEG packets. This makes it impossible to decode the MPEG packets. Therefore, it is necessary to precisely and rapidly synchronize MPEG TS packets. However, as described above, since all 64 bits must be compared, it is difficult to rapidly achieve synchronization. The comparison of only a part of the 64 bits to acquire synchronization makes it difficult to continuously acquire accurate synchronization although acquisition of synchronization may progress quickly.

Accordingly, there is a need for an improved system and method to quickly acquire an initial MPEG TS packet synchronization and to continuously acquire accurate synchronization even though acquisition of synchronization may be progressed quickly.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and an apparatus, in which acquisition of MPEG TS packet synchronization is attempted in two modes, an initial mode and a subsequent mode after the acquisition of synchronization. The dual mode synchronization makes it possible to rapidly acquire an initial MPEG TS packet synchronization.

According to one aspect of an exemplary embodiment of the present invention, a method for synchronization of a moving picture experts group (MPEG) transport stream, which minimizes an initial delay is provided. A packet synchronization unit and a mode of the packet synchronization unit is initialized to "0". Values of sync words are stored by shifting values of a sync word register when the sync words have been received. The received sync word is compared with predetermined code words. As a result of the comparison, a determination is made as to whether a bit difference between the sync words and the predetermined code words exceeds a predetermined threshold value. A verification of whether all bits of the sync words correspond to all bits of the predetermined code words is made when a determination is made that the bit difference is less than or equal to the predetermined threshold value. The MPEG transport stream is descrambled and values of sync words are stored again by shifting values of a sync word register.

In accordance with another aspect of an exemplary embodiment of the present invention, an apparatus for synchronization of a moving picture experts group (MPEG) transport stream, which minimizes an initial delay is provided. The apparatus comprises a sync word register, a code word register, a first comparator, a second comparator and the mode register. The sync word register stores sync words by shifting register values when the sync words have been received. The code word register stores predetermined code words. The first comparator compares the sync words, which has been received by and stored in the sync word register, with the code words received from the code word register. The second comparator compares a result value obtained by the first comparator with a predetermined threshold value and the second comparator operates when a mode register has a value of "0". The mode register comprises a value of "1" when all bits of the sync words correspond to all bits of the code words as a result of the comparison by the second comparator.

Other objects, advantages and salient features of the invention will become apparent to those skilled in the art from the following detailed description, which taken in conjunction with the annexed drawings, discloses exemplary embodiments of the invention.

BRIEF DESCRIPTION OF THE DRAWINGS

The above and other objects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 5:
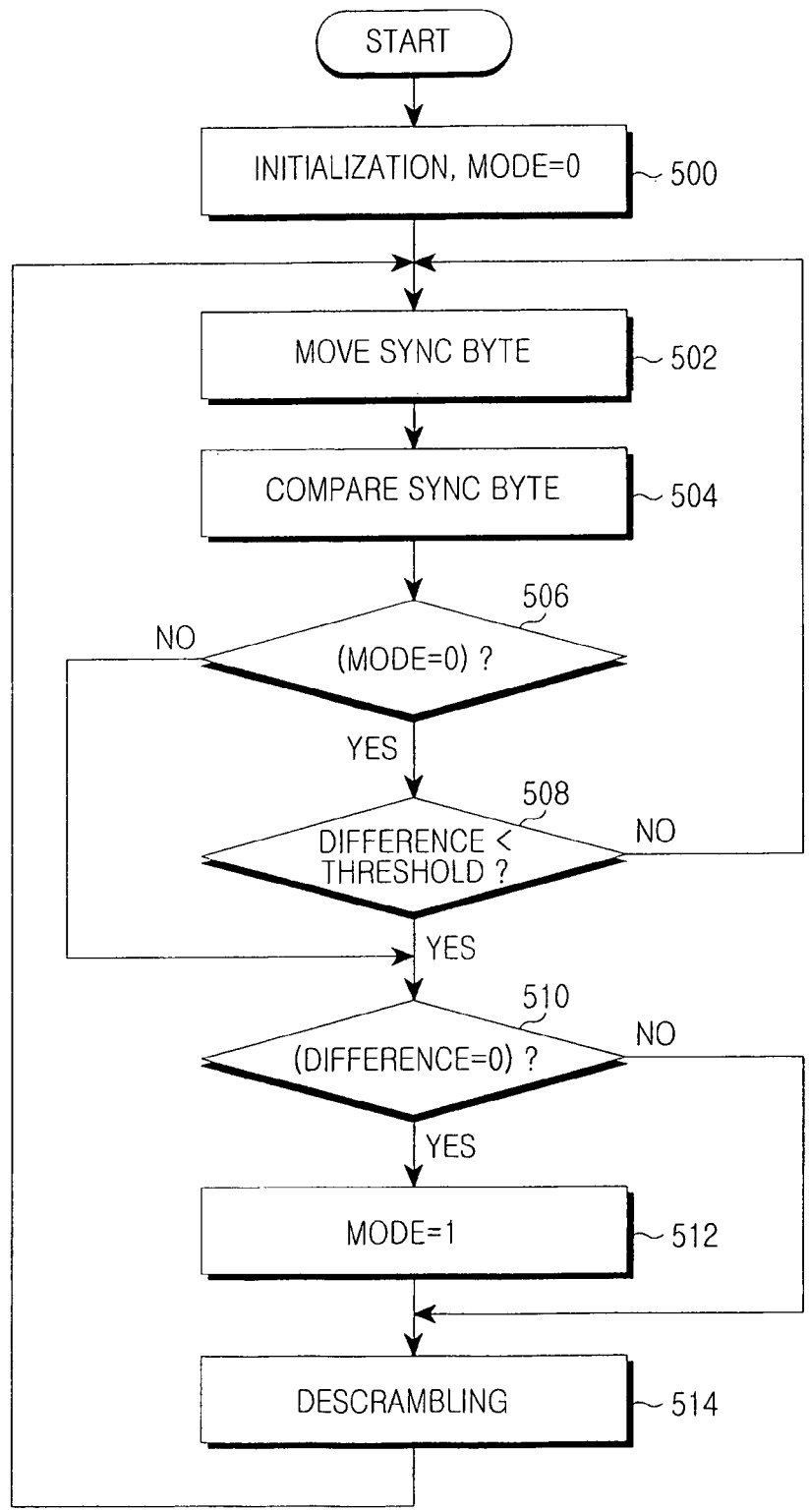
FIG. 5 is a flowchart illustrating an MPEG TS synchronization procedure according to an exemplary embodiment of the present invention.

FIG. 5 is a flowchart illustrating an MPEG TS synchronization procedure according to an exemplary embodiment of the present invention.

Figure 1:
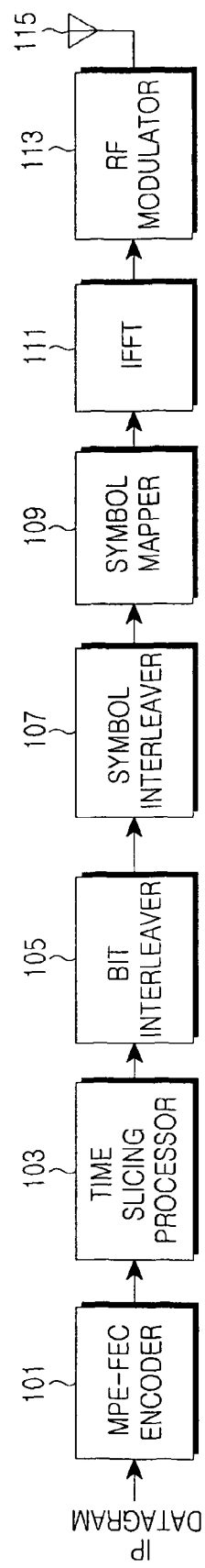
FIG. 1 is a block diagram illustrating the construction of a transmitter in a typical DVB-H system.
Figure 2:
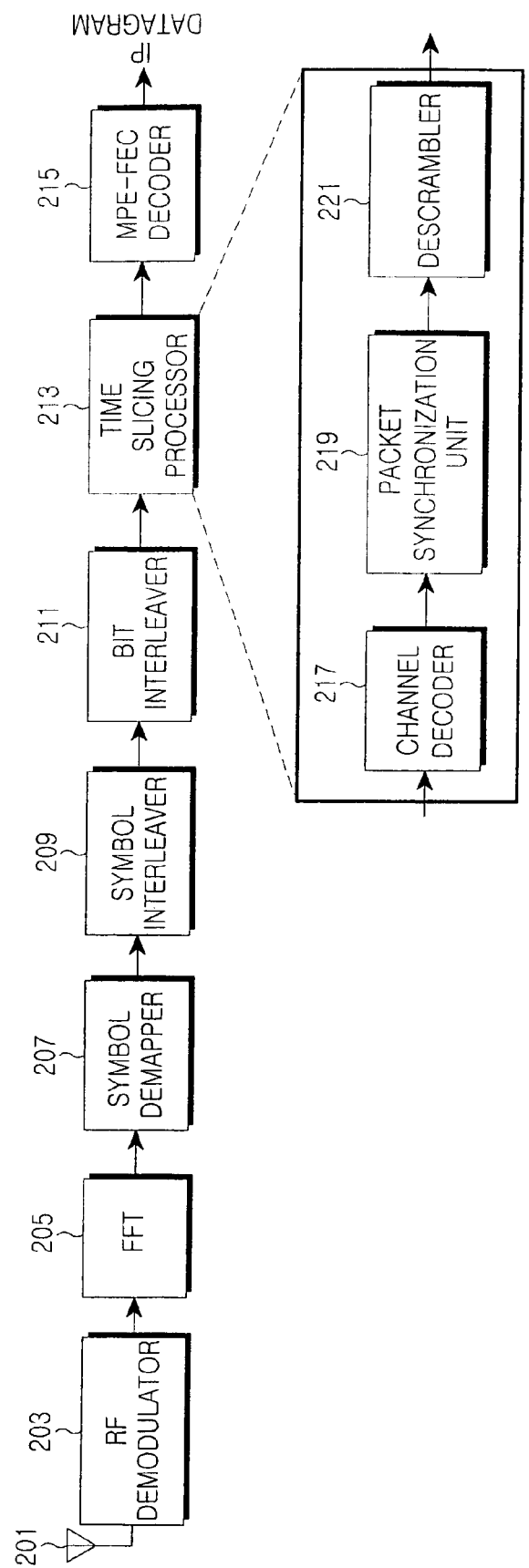
FIG. 2 is a block diagram illustrating the construction of a receiver in a typical DVB-H system.
Figure 3:
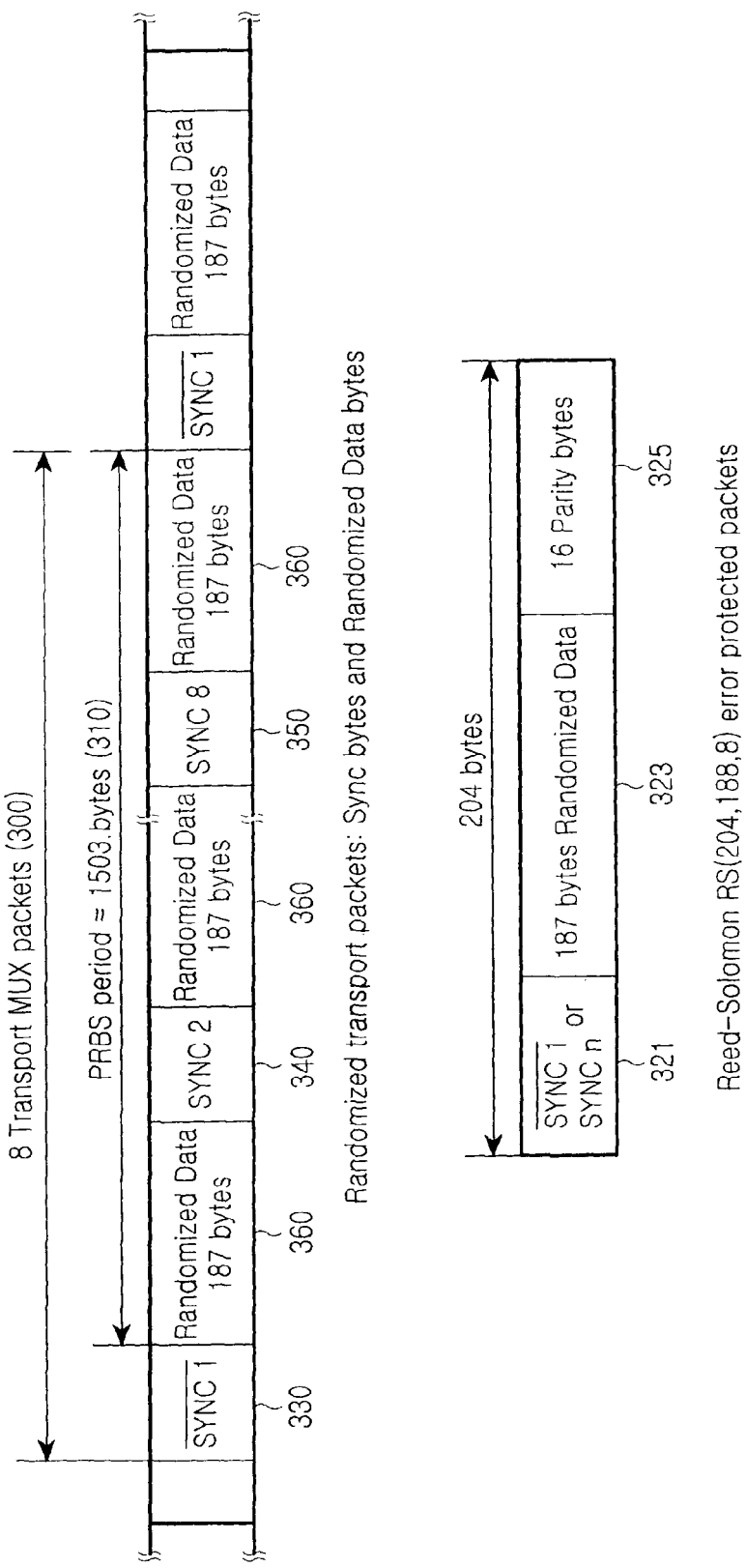
FIG. 3 is a view illustrating the structures of TS and RS packets in a typical DVB-H system.
Figure 4:
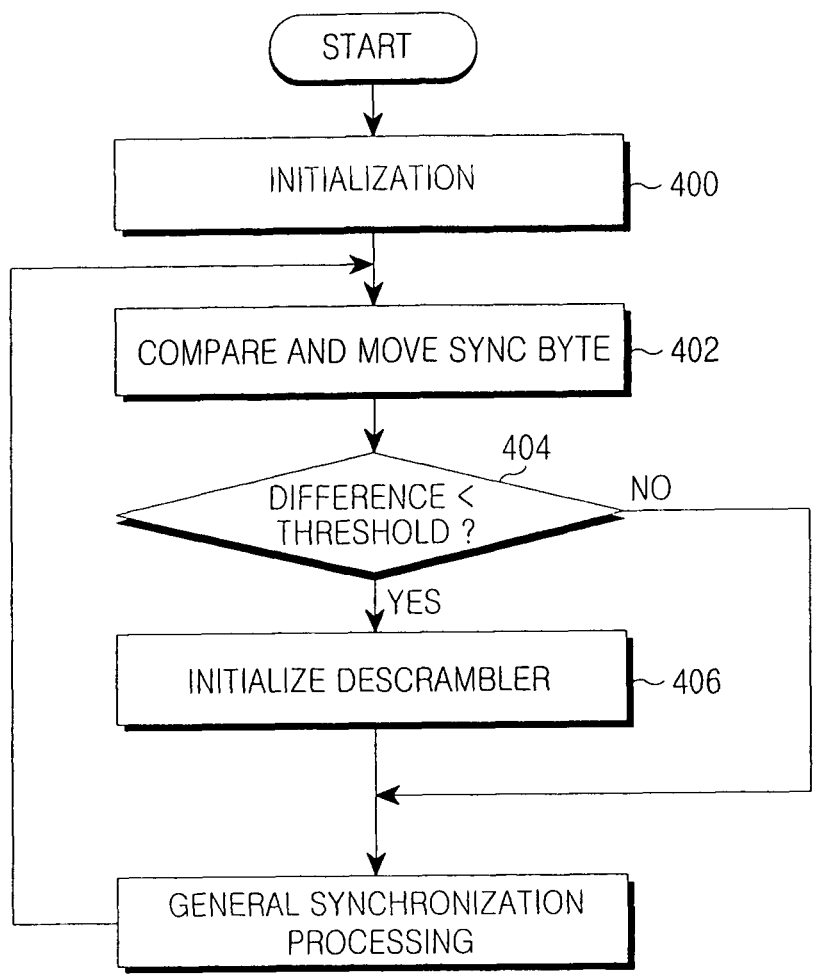
FIG. 4 is a flowchart illustrating an MPEG TS synchronization procedure in a typical DVB-H system.

In step 500, a packet synchronization unit 219 of a receiver, which is illustrated in FIG. 2, is initialized, and a mode register in the packet synchronization unit 219 is initialized to "0". When the receiver has newly received sync words after the initialization, the receiver shifts register values to store the values of the newly-received sync words (step 502).

In step 504, the receiver compares the received sync words with predetermined code words. When a mode value is not "0" (step 506), the receiver omits step 508 and proceeds to step 510. When the mode value is '0' (step 506), the receiver performs step 508. In step 508, the receiver determines if a bit difference between the received sync words and the code words exceeds a predetermined threshold value based on a result of the comparison of step 504. Then, the receiver proceeds to step 510 when a determination is made based on the comparison that the bit difference does not exceed the predetermined threshold value, and returns to step 502 when the bit difference exceeds the predetermined threshold value. Thereafter, step 508 must be performed, in order to reduce an initial delay when the receiver acquires a synchronization timing of an MPEG TS.

In step 510, the receiver verifies if all bits of the received sync words correspond to all bits of the code words. When all bits of the received sync words correspond to those of the code words, the receiver changes the value of the mode register to $\partial 1$". The mode register is used to discriminate between mode "0" and mode "1". Thereafter, the MPEG TS packet is descrambled in step 514 and then the procedure returns to step 502. In contrast, when a determination is made in step 510 that all bits of the received sync words do not correspond to those of the code words, step 514 of descrambling the MPEG TS packet is performed, and then the procedure returns to step 502.

As described above, when the receiver initially acquires an initial MPEG TS packet synchronization, the receiver operates based on a condition relieved by a threshold value (such as, based on a condition that error portions among 64 bits are less than the threshold value). Then, after all 64 bits of the received sync words correspond to those of the code words, a synchronization timing is updated only when all 64 bits of the sync words perfectly correspond to those of the code words. In other words, the receiver acquires a synchronization based on the relieved condition until all 64 bits of the received sync words correspond to those of the code words, and the receiver is shifted to a mode used in the prior art when all 64 bits of the received sync words correspond to those of the code words.

That is, an exemplary embodiment of the present invention uses two modes for synchronization acquisition. The receiver roughly acquires synchronization at an initial stage. Then, after a synchronization has been acquired, the receiver updates a synchronization timing only when a complete synchronization condition is satisfied.

Figure 6:
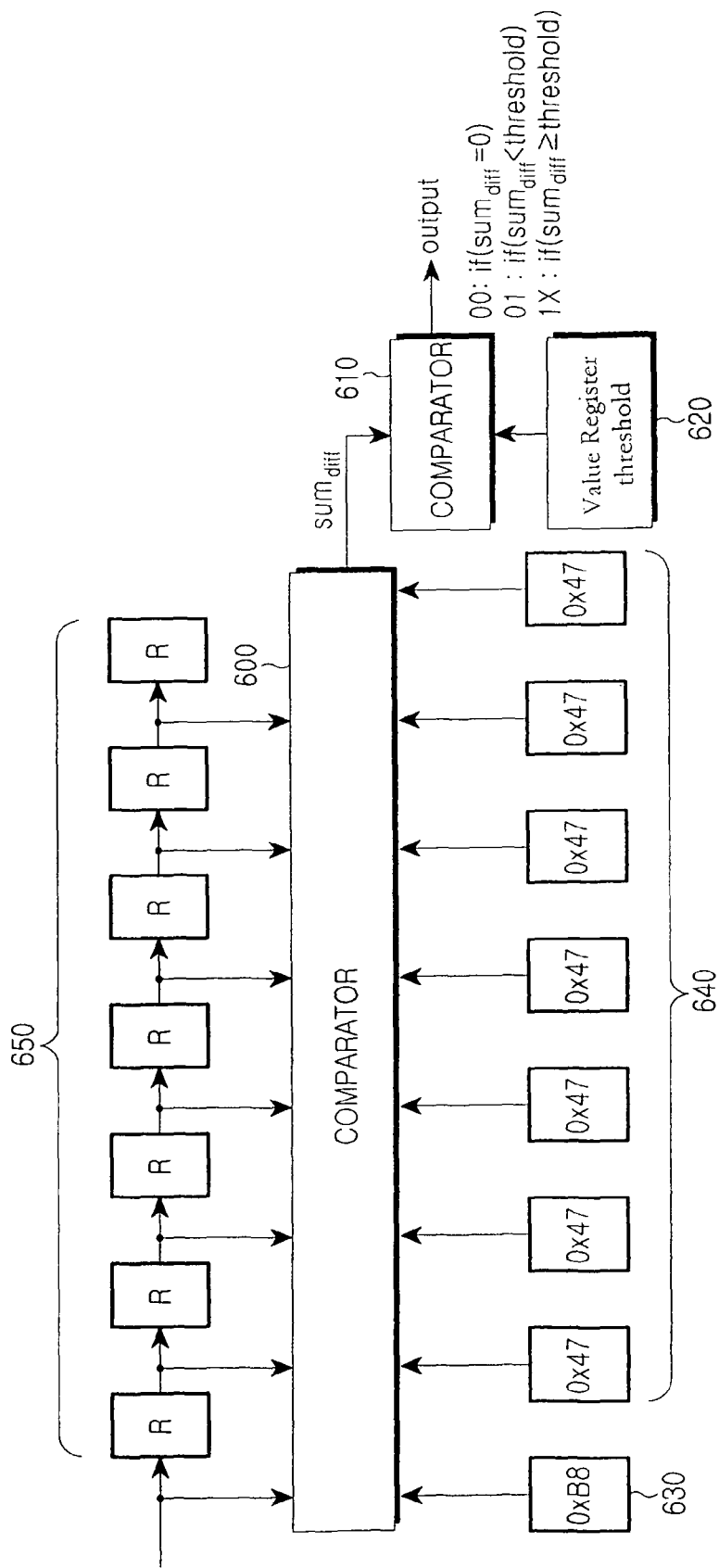
FIG. 6 is a block diagram illustrating an MPEG TS synchronization apparatus according to an exemplary embodiment of the present invention.

FIG. 6 is a block diagram illustrating an MPEG TS synchronization apparatus according to an exemplary embodiment of the present invention.

The MPEG TS synchronization apparatus includes a first comparator 600, a second comparator 610, a mode register (not shown), a threshold value register 620, code word registers 630 and 640 for storing one 0xB8 and seven 0x47s, and seven sync word registers 650.

The sync word registers 650 shift their register values to store values of newly-received sync words, when the sync word registers 650 have received the sync words. The code word registers store predetermined code words. The first comparator 600 compares code words received from the code word registers 630 and 640 with the sync words, which have been received by and stored in the sync word registers 650. The second comparator 610, which operates when the mode register has a value of "0", compares a result value of the first comparator with a predetermined threshold value stored in the threshold value register 620. The mode register has a value of "0" as an initial value, and has a value of '1" when all bits of the sync words correspond to those of the code words, which is obtained a result of comparison by the second comparator.

The synchronization procedure and apparatus of the present invention can be implemented, at least in part, in program code in a processing device of the receiver, and can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

According to an exemplary embodiment of the present invention, since an MPEG TS packet synchronization can be rapidly acquired even in a poor channel environment, it is possible to descramble MPEG TS packets which may be lost.

Also, according to an exemplary embodiment of the present invention, it is possible to prevent the length of a synchronization operation from increasing in a poor channel environment.

In addition, according to an exemplary embodiment of the present invention, it is possible to initialize a broadcasting receiver within a competitively short time period and more rapidly provide a broadcasting service.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for synchronization of a moving picture experts group (MPEG) transport stream, which minimizes a delay of an initial synchronization, the method comprising:
   comparing sync words indicating a start point of the MPEG transport stream with predetermined code words;
   determining, as a result of the comparison, whether a bit difference between the sync words and the code words is less than or equal to a threshold value when a mode of a packet synchronization unit is set to "0";
   verifying if all bits of the sync words correspond to all bits of the code words, when a determination is made as a result of the determination that the bit difference is less than the threshold value;
   setting the mode of a packet synchronization unit to "1", when a determination is made as a result of the determination that the all bits of the sync words is equal to the all bits of the predetermined code words; and
   descrambling the MPEG transport stream when a determination is made as a result of the determination that the bit difference is less than the threshold value or the mode of the packet synchronization unit is set to "1".

2. The method as claimed in claim 1, wherein, when the mode of the packet synchronization unit is set to "1", a determination of whether the bit difference between the sync words and the code words is less than or equal to the threshold value is not made after the sync words are compared with the code words.

3. The method as claimed in claim 1, wherein, when a determination is made that the bit difference exceeds the threshold value, the method returns to the storing values.

4. The method as claimed in claim 1, wherein, when a determination is made as a result of the verifying that all bits of the sync words correspond to all bits of the code words, the mode of the packet synchronization unit is changed to "1".

5. An apparatus for synchronization of a moving picture experts group (MPEG) transport stream, which minimizes a delay of an initial synchronization, the apparatus comprising:
   a code word register for storing predetermined code words;
   a first comparator for comparing a bit difference between the sync words and the code words with a threshold value, the first comparator operating when a mode register comprises a value of "0";
   a second comparator for comparing all bits of the sync words with all bits of the code words, the second comparator operating when a mode register comprises a value of "0"; and
   the mode register comprising a value of "1" when all bits of the sync words correspond to all bits of the code words as a result of the comparison by the second comparator,
   wherein the MPEG transport stream is descrambled when a determination is made as a result of the determination that the bit difference is less than to the threshold value or the mode of the packet synchronization unit is set to "1".

6. The apparatus as claimed in claim 5, further comprising a threshold value register for the threshold value.

7. The apparatus as claimed in claim 5, wherein an initial value of the mode register comprises "0".

8. The apparatus as claimed in claim 5, wherein the sync word registers shift their register values to store only newly-received sync words.

9. A non-transitory computer-readable medium having embodied thereon a computer program for executing a method for synchronization of a moving picture experts group (MPEG) transport stream, which minimizes a delay of an initial synchronization, the method comprising:
   comparing sync words indicating a start point of the MPEG transport stream with predetermined code words;
   determining, as a result of the comparison, whether a bit difference between the sync words and the code words is less than a threshold value when a mode of a packet synchronization unit is set to "0";
   verifying if all bits of the sync words correspond to all bits of the code words, when a determination is made as a result of the determination that the bit difference is less than or equal to the threshold value;
   setting the mode of a packet synchronization unit to "1", when a determination is made as a result of the determination that the all bits of the sync words is equal to the all bits of the code words; and
   descrambling the MPEG transport stream when a determination is made or the mode of the packet synchronization unit is set to "1".

10. The non-transitory computer-readable medium of claim 9, wherein, when the mode of the packet synchronization unit is set to "1", a determination of whether the bit difference between the sync words and the code words is less than or equal to the threshold value is not made after sync word is compared with the code words.

11. The non-transitory computer-readable medium of claim 9, wherein, when a determination is made that the bit difference exceeds the threshold value, the method returns to the storing values.

12. The non-transitory computer-readable medium of claim 9, wherein, when a determination is made as a result of the verifying that all bits of the sync words correspond to all bits of the code words, the mode of the packet synchronization unit is changed to "1".

* * * * *